(12) United States Patent
Komatsu et al.

(10) Patent No.: US 8,335,073 B2
(45) Date of Patent: Dec. 18, 2012

(54) DIELECTRIC CERAMIC COMPOSITION AND CERAMIC ELECTRONIC COMPONENT

(75) Inventors: Kazuhiro Komatsu, Tokyo (JP); Yoichiro Hoshi, Tokyo (JP); Shuhei Yoshikawa, Tokyo (JP); Yuichiro Sueda, Tokyo (JP)

(73) Assignee: TDK Corporation, Tokyo (JP)

( * ) Notice: Subject to any disclaimer, the term of this patent is extended or adjusted under 35 U.S.C. 154(b) by 139 days.

(21) Appl. No.: 13/043,994

(22) Filed: Mar. 9, 2011

(65) Prior Publication Data

US 2011/0222206 A1     Sep. 15, 2011

(30) Foreign Application Priority Data

Mar. 11, 2010   (JP) ................................ 2010-054937

(51) Int. Cl.
*H01G 4/06* (2006.01)

(52) U.S. Cl. ............... 361/321.5; 361/311; 361/313; 361/321.2; 361/321.4; 361/306.1; 501/137; 501/138; 501/139

(58) Field of Classification Search ............... 361/321.1, 361/321.2, 321.4, 321.5, 311–313; 501/137, 501/138, 139
See application file for complete search history.

(56) References Cited

U.S. PATENT DOCUMENTS

| | | | |
|---|---|---|---|
| 6,559,084 B1 * | 5/2003 | Fujikawa et al. | 501/139 |
| 6,764,976 B2 * | 7/2004 | Kobayashi et al. | 501/139 |
| 7,518,849 B2 * | 4/2009 | Ito et al. | 361/321.2 |
| 7,580,242 B2 * | 8/2009 | Aman et al. | 361/321.5 |
| 7,759,269 B2 * | 7/2010 | Takahashi et al. | 501/138 |
| 8,008,222 B2 * | 8/2011 | Shibasaki et al. | 501/139 |
| 8,014,126 B2 * | 9/2011 | Sato et al. | 361/321.4 |
| 2005/0219794 A1 | 10/2005 | Iguchi et al. | |
| 2007/0191211 A1 | 8/2007 | Hosono et al. | |
| 2010/0188797 A1 | 7/2010 | Yamazaki et al. | |

FOREIGN PATENT DOCUMENTS

| | | |
|---|---|---|
| JP | A-2007-217205 | 8/2007 |
| JP | A-2008-135638 | 6/2008 |
| JP | A-2009-73721 | 4/2009 |

* cited by examiner

*Primary Examiner* — Nguyen T Ha
(74) *Attorney, Agent, or Firm* — Oliff & Berridge, PLC (57) ABSTRACT

A dielectric ceramic composition includes, as a main component, a compound having perovskite type crystal structure shown by a general formula $ABO_3$, as subcomponents, in terms of respective element with respect to 100 moles of the compound, and 0.6 to 2.0 moles of an oxide of Mg, 0.010 to 0.6 mole of oxide of Mn and/or Cr, 0.010 to 0.2 mole of an oxide of at least one selected from V, Mo and W, 0.10 to 1.0 mole of an oxide of R1 (R1 is at least one selected from Y, Yb, Er and Ho), 0.10 to 1.0 mole of an oxide of R2 (R2 is at least one selected from Dy, Gd and Tb) and 0.2 to 1.5 moles of a component consisting of an oxide of Ba and/or oxide of Ca and an oxide of Si. According to the present invention, even when a dielectric layer is made thinner, a dielectric ceramic composition having good characteristics can be provided.

7 Claims, 1 Drawing Sheet

DIELECTRIC CERAMIC COMPOSITION AND CERAMIC ELECTRONIC COMPONENT

BACKGROUND OF THE INVENTION

Field of the Invention

The present invention relates to a dielectric ceramic composition and a ceramic electronic component in which said dielectric ceramic composition is applied to a dielectric layer, particularly, a dielectric ceramic composition and a ceramic electronic component having good characteristics, even when the dielectric layer is made thinner.

A multilayer ceramic capacitor which is one example of ceramic electronic components is widely used as electronic component having compact size, high efficiency and high reliability, and the number used in electric and electronic apparatuses is large. In recent years, along with downsizing such apparatuses and improving performance thereof, demands for further compact size, high performance and high reliability to a multilayer ceramic capacitor become more growing.

In order to respond to such demands, it has been progressed to make the dielectric layer of the multilayer ceramic capacitor thinner and larger in number. However, when making a particle size of the dielectric particle smaller in order to make the dielectric layer thinner, there was a problem that specific permittivity decreased so that desired characteristics could not be obtained.

Note that, in Japanese Patent Publication No. 2008-135638 describes that, in a multilayer ceramic capacitor having dielectric layer composed of barium titanate crystal particles and barium calcium titanate crystal particles, two kinds of rare earth elements and other components are included to the barium titanate crystal particles and barium calcium titanate crystal particles. Also, it is described that the multilayer capacitor has high insulation resistance, and decreasing of insulation resistance along with time change at high temperature accelerated test is small.

However, a thickness of the dielectric layer of the multilayer ceramic capacitor described in examples of the Japanese Patent Publication No. 2008-135638 is 2 μm, it is found that the above problem cannot be solved, when the dielectric layer is made thinner further.

BRIEF SUMMARY OF THE INVENTION

The present invention has been made by considering such situation, and a purpose of the invention is to provide a dielectric ceramic composition having good characteristics, and a ceramic electronic component in which the dielectric ceramic composition is applied to a dielectric layer.

In order to achieve the above mentioned purposes, a dielectric ceramic composition according to the present invention includes a compound having perovskite type crystal structure shown by a general formula $ABO_3$, where A is at least one selected from Ba, Ca and Sr, and B is at least one selected from Ti, Zr and Hf, as a main component. The dielectric ceramic composition also includes, as subcomponents, in terms of respective element with respect to 100 moles of the compound, 0.6 to 2.0 moles of an oxide of Mg; 0.010 to 0.6 mole of an oxide of Mn and/or Cr; 0.010 to 0.2 mole of an oxide of at least one selected from V, Mo and W; 0.10 to 1.0 mole of an oxide of R1, where R1 is at least one selected from Y, Yb, Er and Ho; 0.10 to 1.0 mole of an oxide of R2, where R2 is at least one selected from Dy, Gd and Tb; and 0.2 to 1.5 moles of a compound consisting of an oxide of Ba and/or Ca and an oxide of Si.

In the present invention, by setting contents of the main component and subcomponents within the above range, the degree of solute metal elements (particularly R1 and R2) of respective subcomponents in $ABO_3$ which is the math component can be controlled. As a result, even when a dielectric layer is made thinner, a dielectric ceramic composition having good various characteristics (for example, specific permittivity, dielectric loss, CR product, capacitance temperature characteristic and high temperature accelerated lifetime) can be obtained.

Preferably, when a content of the oxide of R1 in terms of R1 is defined as "α" mole, and a content of the oxide of R2 in terms of R2 is defined as "β" mole, the "α" and "β" satisfy relations of $0.50 \leq \beta/(\alpha+\beta) \leq 0.90$ and $0.2 < (\alpha+\beta) < 1.5$.

By setting the α and β within the above range, the degrees of solute R1 and R2 in $ABO_3$ can be preferable further. As a result, the above mentioned effects can be improved further.

Preferably, when a content molar ratio of the Ba is defined as "a", a content molar ratio of the Ca is defined as "b" and a content molar ratio of the Si is defined as "c" in the component, the "a" "b" and "c" satisfy relations of $a+b+c=1$, $0 \leq a \leq 0.5$, $0 \leq b \leq 0.5$ and $0.5 \leq c \leq 0.8$.

By setting a proportional ratio of the respective metal elements in the above component including Ba and the like within the above range, the dielectric ceramic composition can improve characteristics further.

Preferably, when a content of the component in terms of the respective element is defined as "m" moles, the "α", "β" and "m" satisfy a relation of $(\alpha+\beta)/m \leq 10.5$.

By setting contents of the oxides of R1 and R2 and a content of the component including Ba and the like within the above relation, particularly, a firing temperature can be lowered so that a low temperature firing becomes possible.

Preferably, the R1 is Y and the R2 is Dy. By using the above elements as the R1 and R2, the above mentioned effects can be improved further.

Preferably, the $ABO_3$ is $BaTiO_3$. By having this constitution, a dielectric ceramic composition having large capacity and high reliability can be obtained.

Also, a ceramic electronic component according to the present invention comprises a dielectric layer composed of any one of the above mentioned dielectric ceramic compositions and an electrode. As for the ceramic electronic component, although it is not particularly limited, a multilayer ceramic capacitor, a piezo element, a chip inductor, chip varistor, a chip thermistor, a chip resistance and other surface mounted device (SMD) chip type electronic components are exemplified.

DETAILED DESCRIPTION OF THE INVENTION

Figure 1:
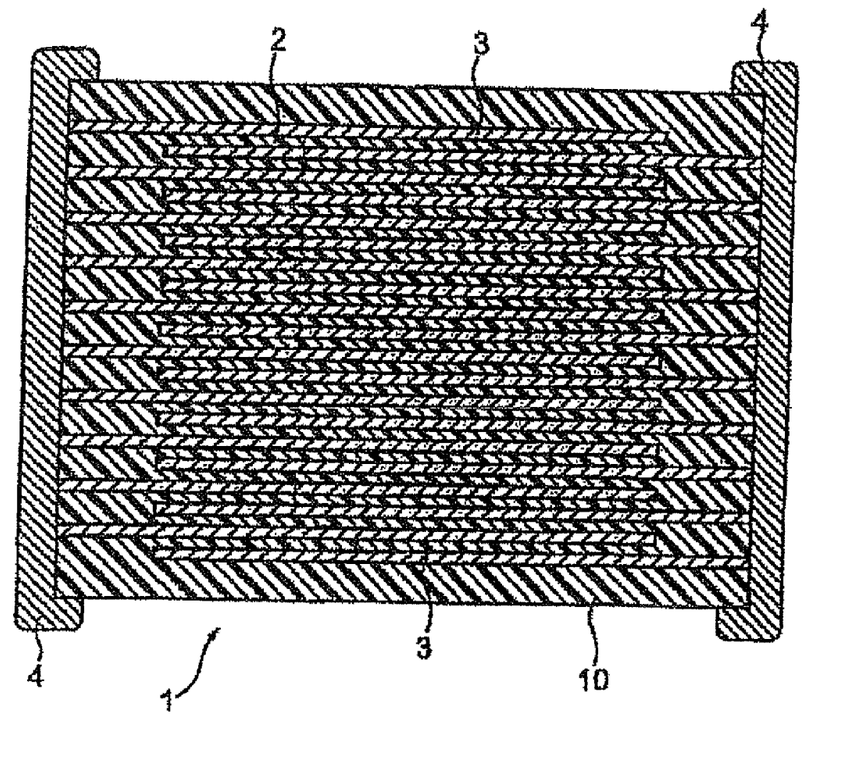
FIG. 1 is a cross sectional view of a multilayer ceramic capacitor according to one embodiment of the present invention.

Below, the present invention will be explained based on embodiments shown in the drawing.
(Multilayer Capacitor 1)
As shown in FIG. 1, a multilayer ceramic capacitor 1 as one example of multilayer ceramic electronic component comprises a capacitor element body 10 in which a dielectric layer 2 and an internal electrode layer 3 are alternately stacked. The internal electrode layers 3 are stacked so that each end face is alternately exposed to surfaces of the two opposed end portions of the capacitor device body 10. Also, the pair of external electrodes 4 is formed at both end portions of the capacitor device body 10, and connected with the exposed end faces of the alternately-stacked internal electrode layers 3 to form a capacitor circuit.

Although the shape of the capacitor element body 10 is not particularly limited, as shown in FIG. 1, normally, it is formed as a rectangular parallelepiped shape. Also, a dimension thereof is not particularly limited, it may be decided appropriately depending on the use.

(Dielectric Layer 2)

The dielectric layer 2 is composed of a dielectric ceramic composition according to the present embodiment. The dielectric ceramic composition according to the present embodiment includes, as a main component, a compound shown by a general formula $ABO_3$ ("A" is at least one selected from Ba, Ca and Sr, and "B" is at least one selected from Ti, Zr and Hf). Also, the dielectric ceramic composition includes dielectric particles whose main component is $ABO_3$.

As for the $ABO_3$, for example, a compound shown by $\{(Ba_{1-x-y}Ca_xSr_y)O\}_u(Ti_{1-z}Zr_z)_vO_2$ is exemplified. Note that, although any of "u", "v", "x", "y" and "z" is within an arbitrary range, it is preferable that they are within a following range.

In the above formula, the "x" is preferably $0 \leq x \leq 0.1$, more preferably $0 \leq x \leq 0.05$. The "x" shows number of Ca atoms, and a capacitance temperature coefficient and a specific permittivity can be controlled arbitrarily by setting the "x" within the above range. When the "x" is too large, the specific permittivity tends to be reduced. In the present embodiment, the Ca may not be included necessarily.

In the above formula, the "y" is preferably $0 \leq y \leq 0.1$, more preferably $0 \leq y \leq 0.05$. The "y" shows number of Sr atoms, and a capacitance temperature coefficient and a specific permittivity can be also controlled arbitrarily by setting the "y" within the above range. When the "y" is too large, the specific permittivity tends to be reduced and the temperature characteristic tends to be deteriorated. In the present embodiment, the Sr may not be included necessarily.

In the above formula, the "z" is preferably $0 \leq z \leq 0.2$, more preferably $0 \leq z \leq 0.18$. The "z" shows number of Zr atoms, and a sinterability and a resistance to reduction can be improved by setting the "z" within the above range. When the "z" is too large, the specific permittivity, the specific permittivity tends to be reduced and the temperature characteristic tends to be deteriorated. In the present embodiment, the Zr may not be included necessarily.

In the present embodiment, as for the $ABO_3$, barium titanate (preferably, shown by $Ba_uTi_vO_3$ where u/v is $0.994 \leq u/v \leq 1.002$) can be used preferably.

Also, in the perovskite type crystal structure, c/a which shows a ratio of a lattice constant of a c-axis and a lattice constant of an a-axis is preferably 1.0085 or more. When the c/a is too small, the specific permittivity tends to be decreased significantly with making a crystal particle size of the dielectric particle smaller.

Note that, it is not necessary that the c/a of whole dielectric particles satisfy the above range. Namely, for example, particles having low c/a (cubic system) and particles having high c/a (tetragonal system) may be coexisted in a material powder of the $ABO_3$ as far as there are many particles having tetragonal structure in the material powder and c/a of the material powder as a whole is within the above range.

The dielectric ceramic composition according to the present embodiment includes, in addition to the above main component, an oxide of R1 (R1 is at least one selected from Y, Yb, Er and Ho), an oxide of R2 (R2 is at least one selected from Dy, Gd and Tb), an oxide of Mg, an oxide of at least one selected from V, Mo and W, and a component consisting of an oxide of Ba and/or Ca and an oxide of Si, as subcomponents.

When a content of the oxide of R1 is defined as "α", the "α" is preferably 0.10 to 1.0 mole, more preferably 0.2 to 0.8 mole, in terms of R1 element with respect to 100 moles of $ABO_3$. When the "α" is too much, the specific permittivity tends to be decreased. On the other hand, when it is too little, the reliability tends to be deteriorated. The R1 is at least one selected from Y, Yb, Er and Ho, and is particular preferably Y.

When a content of the oxide of R2 is defined as "β", the "β" is preferably 0.10 to 1.0 mole, more preferably 0.2 to 0.8 mole, in terms of R2 element with respect to 100 moles of $ABO_3$. When "β" is too much, a change rate of capacitance to the temperature tends to be larger. On the other hand, when it is too little, it tends to be hard to maintain the reliability. The R2 is at least one selected from Dy, Gd and Tb, and is particular preferably Dy.

Also, it is preferable that the "α" and "β" satisfy relations of $0.50 \leq \beta/(\alpha+\beta) \leq 0.90$ and $0.20 < (\alpha+\beta) < 1.5$. More preferably, they satisfy relations of $0.6 \leq \beta/(\alpha+\beta) \leq 0.83$ and $0.5 \leq (\alpha+\beta) \leq 1.2$. When the $\beta/(\alpha+\beta)$ is too large, the dielectric loss (tan δ) tends to be deteriorated, and when it is too small, the lifetime tends to be reduced. Also, when the (α+β) is too large, it tends to be hard to obtain a desired specific permittivity, and when it is too small, the tan δ tends to be larger.

In the present embodiment, metal elements of the subcomponents, for example, the R1 and R2 are solid-soluted in a dielectric particle whose main component is the $ABO_3$. Note that, the dielectric particle may be partially solid-soluted or may have a totally solid-solution type structure.

When the R2 is included in the dielectric particle, although it is capable to improve reliability with maintaining good specific permittivity, the capacitance temperature characteristic tends to be deteriorated. Moreover, this tendency becomes more significant when the dielectric layer is made thinner or more. Thus, by including the R1 in the dielectric particle, the capacitance temperature characteristic can be improved with maintaining reliability. Such effect becomes more particularly significant, if the "α" and "β" satisfy the above relations.

Also, by controlling the degrees of solute R1 and R2, the descent of the specific permittivity can be prevented, even when the crystal particle size is made smaller.

A content of an oxide of Mg is preferably 0.6 to 2.0 moles, in terms of Mg with respect to 200 moles of $ABO_3$ When the content of the oxide of Mg is too much, a temperature characteristic tends to be deteriorated. On the other hand, when it is too little, it tends not to progress the sintering sufficiently.

A content of an oxide of Mn and/or Cr is preferably 0.010 to 0.6 mole, more preferably 0.05 to 0.3 mole, in terms of Mn and/or Cr with respect to 100 moles of $ABO_3$. When the content of the oxide of Mn and/or Cr is too much, a change rate of capacitance tends to be larger. On the other hand, when it is too little, reliability tends to be deteriorated, because resistance to reduction cannot be obtained sufficiently. In the present embodiment, Mn is preferable.

A content of an oxide of at least one selected from V, Mo and W is preferably 0.010 to 0.2 mole, more preferably 0.02 to 0.15 mole, in terms of V, Mo and W with respect to 100 moles of $ABO_3$. When the content of the above oxide is too much, insulation resistance tends to be deteriorated. On the other hand, when it is too little, reliability tends to be deteriorated. In the present embodiment, V is preferable.

A component consisting of an oxide of Ba and/or Ca and an oxide of Si mainly has a role of sintering aids. Also, when a content of the component is defined as "m", the "m" is preferably 0.2 to 2.0 moles, more preferably 0.5 to 1.5 moles, in terms of Ba, Ca and Si with respect to 100 moles of $ABO_3$. Note that, it is not preferable that the oxide of Si as alone (for example, $SiO_2$) is included in the dielectric ceramic composition, because the dielectric particles are likely to grow further.

Also, in the present embodiment, in the component, when a content molar ratio of Ba is defined as "$\alpha$", a content molar ratio of Ca is defined as "b" and a content molar ratio of Si is defined as "c", it is preferable that the "$\alpha$", "b" and "c" satisfy relations of $a+b+c=1$, $a+b \leq c$, $0 \leq a \leq 0.5$, $0 \leq b \leq 0.5$ and $0.5 \leq c \leq 0.8$. More preferably, they satisfy relations of $a+b<c$, $0 \leq a \leq 0.45$ and $0.55 \leq c \leq 0.8$. Namely, a proportional ratio of Si in the component (for example, $SiO_2$) is equal to or more than a sum of proportional ratios of Ba and C (for example, BaO and CaO). By satisfying these relations, it is possible to improve sinterability as well as the specific permittivity.

Although a crystal particle size of the dielectric particle included in the dielectric ceramic composition according to the present embodiment is not particularly limited, in order to respond to the demand for making the dielectric layer thinner, it is preferably 0.1 to 0.3 μm. Also, the dielectric ceramic composition according to the present embodiment may further include other components depending on desired characteristics.

Although a thickness of the dielectric layer 2 is not particularly limited, it is preferably 2.0 μm or below per layer, more, preferably 1.0 μm or below per layer. Although not particularly limited, a lower limit of the thickness is, for example, 0.4 μm and so on.

Although the number of stacked layers of the dielectric layer 2 is not particularly limited, it is preferably 20 or more, more preferably 50 or more, particularly preferably 100 or more. Although not particularly limited, an upper limit of the number of stacked layers is, for example, 2000 and so on.

(Internal Electrode Layer 3)

Although a conductive material included in the internal electrode layer 3 is not particularly limited, comparatively inexpensive base metal may be used, because the material constituting the dielectric layer 2 has resistance to reduction. As for the base metal of the conductive material, Ni or Ni alloy is preferable. As for the Ni alloy, an alloy of at least one kind of elements selected from Mn, Cr, Co and Al with Ni, and Ni content amount in the alloy is preferably 95 wt % or more. Note that, in the Ni or Ni alloy, 0.1 wt % or below or so of various miner component such as P and the like may be included. Although a thickness of the internal electrode layer 3 may be suitably decided depending on a purpose of use and the like, it is normally 0.1 to 3 μm, particularly preferably 0.2 to 2.0 μm and so on.

(External Electrode 4)

Although a conductive material included in an external electrode 4 is not particularly limited, in the present embodiment, inexpensive Ni, Cu and their alloys may be used. A thickness of the external electrode may be suitably decided depending on a purpose of use and the like, and normally 10 to 50 μm and so on is preferable.

(Producing Method for Multilayer Ceramic Capacitor 1)

A multilayer ceramic capacitor 1 of the present embodiment is produced by, as similar with a conventional multilayer ceramic capacitor, producing a green chip by a normal printing method or sheet method using a paste, then firing thereof, and firing after printing or transferring an external electrode. Below, a method for producing will be explained specifically.

First, as for raw materials, a material powder of $ABO_3$ to be included in the dielectric ceramic composition as a main component, and a gel slurry of hydroxide of metal element or an aqueous solution of the element to be included as subcomponents are prepared.

As for the material powder of the $ABO_3$, it is not particularly limited, oxides of the above components, mixtures thereof and composite oxides thereof can be used. Also, various compounds which become the above oxide or composite oxide by firing, for example, those suitably selected from carbonate, oxalate, nitrate, hydroxide, organic metal compounds and the like, and mixtures thereof may be used.

The material of the $ABO_3$ may be used as produced by various methods such as various liquid phase methods (for example, oxalate method, hydrothermal synthesis method, alkoxide method, sol-gel method and the like) as well as so-called solid phase method.

As for a material of rare earth, element, it is preferable to prepare a gel slurry of hydroxide of the rare earth element, as for a material of other metal elements, it may be prepared as the gel slurry of hydroxide of the metal element or may be prepared as the aqueous solution. Note that, as for a material of the component including Ba and the like, it is preferable to prepare gel slurry hydroxide or aqueous solution of each metal element in the component. Contrary to this, it is not preferable to add these elements as a form of composite oxides or a glass powder of the metal elements composing the component. Because by adding of the component as the form of the composite oxides, it easily results in insufficient dispersion, thus it tends to be hard to obtain the above mentioned effects. Also, by adding of the component as the form of glass powder, it tends to be hard to obtain the above mentioned effects, because a particle size of the glass powder is larger.

Next, in the present embodiment, the material powder of $ABO_3$ and the thus-obtained gel slurry of hydroxide or aqueous solution of the metal elements of the subcomponents are dispersed with water by using an agitation type dispersing machine so as to obtain a mixture of materials. Although a condition of dispersion is not particularly limited, it is preferable to use, for example, medium of ϕ0.1 mm or below. Note that, pre-dispersion may be performed prior to the dispersion by using the agitation type dispersing machine.

In the dispersion, material powder of the $ABO_3$ and the subcomponents (gel slurry of hydroxide or aqueous solution of metal elements) are dispersed uniformly, with pulverizing the material powder of the $ABO_3$. Also, in the dispersion, it is preferable to add a hydrophilic dispersion agent in order to improve the dispersibility of the mixture of materials further. As for the hydrophilic dispersion agent, for example, dispersion agent of polycarboxylic acid is exemplified.

The obtained mixture of materials is dried by, for example, spray drying and the like. In the mixture of materials after drying, metal elements of the subcomponents in gel slurry of hydroxide or aqueous solution are coated on a surface of the $ABO_3$ particle.

By producing the mixture of materials through such the processes like this, the degree of metal elements of the subcomponents in $ABO_3$ particle can be controlled in a thermal treatment process and a firing process described below, as a result, a dielectric ceramic composition which attains desired characteristics can be obtained. For example, by coating the rare earth elements in the form of gel slurry of hydroxide on the $ABO_3$ particle, it is possible to prevent the rare earth elements from being excessively solid-soluted into the $ABO_3$ particle. As a result, desired characteristics can be obtained.

Subsequently, the heat treatment is performed to the mixture of materials after drying. By performing the heat treatment, the metal elements of the subcomponents coated on the surface of the $ABO_3$ particle are fixed to the particle more rigidly. A holding temperature in the heat treatment is preferably within a range of 400 to 900° C. Also, a holding time is preferably 0.1 to 3.0 hrs. Note that, the drying and the heat treatment of the mixture of materials may be performed simultaneously.

After the heat treatment, because the mixture of materials is aggregated, the mixture of materials may be pulverized to the extent that aggregation is loosened. Note that, this pulverization may be performed after preparing a dielectric layer paste described below.

A particle size of the mixture of materials (dielectric material) after the heat treatment is normally 0.1 to 1 µm and so on as an average particle size. Next, the dielectric material is made into a paste so as to prepare a dielectric layer paste. The dielectric layer paste may be an organic type paste obtained by kneading the dielectric material and an organic vehicle, or a water-based paste.

The organic vehicle is obtained by dissolving a binder in an organic solvent. The binder used for the organic vehicle is not particularly limited, and may be suitably selected from various normal binders such as ethyl cellulose, polyvinyl butyral and the like. Also, the organic solvent is not particularly limited, and may be suitably selected from various solvents such as terpineol, butyl carbitol, acetone, toluene and the like depending on the method such as printing method or sheet method.

Also, when preparing the dielectric layer paste as water-based paste, a water-based vehicle obtained by dissolving a water soluble binder, dispersion agent and the like in water, and the dielectric material may be kneaded. The water-soluble binder used for the water-based vehicle is not particularly limited, and for example, polyvinyl alcohol, cellulose, water-soluble acrylic resin and the like can be used.

An internal electrode layer paste is obtained by kneading conducting materials consisting of the above mentioned various conducting metals and alloys, or various oxides, organic metallic compound and resinate, etc., which become the above-mentioned conducting materials after firing, with the above-mentioned organic vehicle. Also, the internal electrode layer may include inhibitor. As for the inhibitor, although not particularly limited, it is preferable that it has a similar composition as the main component.

The external electrode paste can be prepared as similar with the above mentioned internal electrode layer paste.

A content of the organic vehicle in the each of the above mentioned paste is not particularly limited, and may be normal content, and for example, it may be 1 to 5 wt % or so of the binder, 10 to 50 wt % or so of the solvent. Also, in the each paste, additives selected from various dispersant agent, plasticizer, dielectric material, insulation material and the like may be included if needed. A total amount thereof is preferably 10 wt % or less.

When using the printing method, the dielectric layer paste and the internal electrode layer paste are printed on a substrate such as PET and the like and stacking them, and cutting the stack to a predetermined shape, and after that, a green chip is obtained by removing from the substrate.

When using the sheet method, a green sheet is formed by using the dielectric layer paste, after printing the internal electrode layer paste thereon so as to form an internal electrode pattern, and then, they are stacked so as to obtain a green chip.

Binder removal treatment is performed to the green chip, before firing. As for the binder removal conditions, a temperature rising rate is preferably 5 to 300° C./hr, a holding temperature is preferably 180 to 400° C. and a temperature holding time is preferably 0.5 to 24 hrs. Also, binder removal atmosphere is air or reduced atmosphere.

After the binder removal treatment, the green chip is fired. A temperature rising rate is preferably 100 to 2000° C./hr. A holding temperature is preferably 1300° C. or less, more preferably 1100 to 1250° C., and a holding time is preferably 0.5 to 8 hrs, more preferably 2 to 3 hrs. If the holding temperature is below said range, the densification becomes insufficient; and if it exceeds said range, the breakage of the electrode due to the abnormal sintering of the internal electrode layer, the deterioration of the capacitance temperature characteristic due to the dispersion of the constitutional material of the internal electrode layer, or a reduction of the dielectric ceramic composition tend to occur.

Firing atmosphere is preferably reducing atmosphere, and as for an atmosphere gas, for example, a wet mixture gas of $N_2$ and $H_2$ may be preferably used.

Also, an oxygen partial pressure when firing may be suitably decided depending on a kind of the conductive material in the internal electrode layer paste. When using base metal such as Ni or Ni alloy and the like, the oxygen partial pressure in the firing atmosphere is preferably $10^{-14}$ to $10^{-10}$ MPa. If the oxygen partial pressure is below said range, the conducting material of the internal electrode layer may have abnormal sintering which results in a breakage thereof. Also, if the oxygen partial pressure exceeds said range, the internal electrode layer tends to oxidize. A temperature descending rate is preferably 50 to 2000° C./hr.

It is preferable to perform annealing to a capacitor element body after firing in the reducing atmosphere. The annealing is a treatment for reoxidation of the dielectric layer, and thereby the reliability is improved, because IR lifetime (lifetime of insulation resistance) can be made extremely longer.

An oxygen partial pressure in the anneal atmosphere is preferably $10^{-9}$ to $10^{-5}$ MPa. When the oxygen partial pressure is less than the above range, reoxidation of the dielectric layer is difficult; and when exceeding the above range, oxidation of the internal electrode layer tends to be progressed.

Also, a holding temperature at the time of annealing is preferably 1100° C. or below, particularly preferably 900 to 1100° C. When the holding temperature is less than the above mentioned range, the dielectric layer may not be sufficiently oxidized. As a result, IR can be easy to lower and IR lifetime can easily be shortened. On the other hand, when the holding temperature exceeds the above mentioned range, not only reduction of a capacitance due to oxidization of the internal electrode layer, but also deterioration of the capacitance temperature characteristic, decrease in IR and reduction of IR lifetime can easily occur. Note that, the annealing can only be constituted by the temperature rising process and temperature descending process. Namely, the temperature holding time may be 0. In this case, the holding time is same as a maximum temperature.

As for other annealing conditions, a temperature holding time is preferably 0 to 20 hrs, more preferably 2 to 4 hrs, and a temperature descending rate is preferably 50 to 500° C./hr, more preferably 100 to 300° C./hr. Also, as for an atmosphere gas of the annealing, for example, it is preferable to use wet $N_2$ gas and the like.

In the above mentioned binder removal treatment, firing and annealing, in order to wet the $N_2$ gas and mixture gas and the like, for example, a wetter and the like may be used. In this case, a water temperature is preferably 5 to 75° C. or so.

The binder removal treatment, firing and annealing may be performed continuously or individually.

An end face polishing is conducted to a capacitor element body obtained as above, for example, by barrel polishing or sandblast, and then, an external electrode paste is printed to bake, so that an external electrode 4 is formed. Then a covering layer is formed on a surface of the external electrode 4 by plating and the like if needed.

Thus-produced multilayer ceramic capacitor of the present embodiment is used for various electronic components and the like by mounting on a print circuit board and the like with soldering and the like.

The foregoing has been described with respect to an embodiment of the present invention, however, the present invention is not limited to the above mentioned embodiment at all, and various modifications can be made within a scope of the present invention.

For example, in the above embodiment, a multilayer ceramic capacitor is explained as an example of a ceramic electronic component according to the present invention. However, such ceramic electronic component is not limited to a multilayer ceramic capacitor and may be any as far as it includes the above composition.

EXAMPLES

Below, the present invention will be explained based on further detailed examples, however, the present invention is not limited to these examples.

Example 1

Firstly, as for a material powder of $ABO_3$, $BaTiO_3$ powder is prepared (u/v=1.000). A c/a of the powder was 1.0095. As for a material of subcomponents, gel slurries of hydroxides were prepared for Y and Dy, aqueous solutions were prepared for Mg, Mn, V, Ba and Ca. Also, as for a material of Si, colloidal silica dispersed in water (aqueous dispersion of Si) was prepared. Note that, amounts of the main component and subcomponents were determined so as to be values shown in Table 1. Also, the "a", "b" and "c" in the component including Ba and the like were determined so as to be 0.3, 0.15 and 0.55, respectively.

Next, $BaTiO_3$ powder and the materials of the subcomponents were pre-dispersed by a ball-mill. Dispersion time was 1 hr. After pre-dispersion, a mixture of materials was dispersed for 48 hrs by a bead mill with which media of φ0.1 mm are filled, and prepared. Namely, the $BaTiO_3$ powder, gel slurry of hydroxide or aqueous solution of each element and aqueous dispersion of Si were dispersed. Also, as for a dispersion agent, 2.0 wt % of polycarboxylic acid of dispersion agent was added with respect to 100 wt % of $BaTiO_3$.

After drying the obtained mixture of material by a spray dryer at 250° C., the mixture of material was heat-treated at 750° C. during 15 min in a rotary kiln. The mixture of materials after the heat treatment was obtained as a dielectric material.

Next, 100 parts by weight of the obtained dielectric material, 10 parts by weight of polyvinyl butyral resin, 5 parts by weight of dioctylphthalate (DOP) as a plasticizer and 100 parts by weight of alcohol as solvent were mixed by a ball-mill and made into a paste so that a dielectric layer paste was obtained.

Also, 44.6 parts by weight of Ni particle, 52 parts by weight of terpineol, 3 parts by weight of ethylcellulose, 0.4 parts by weight of benzotriazole were kneaded by triple roll mill and made into a paste so that an internal electrode layer paste was obtained.

Then, a green sheet was formed on a PET film by using the dielectric layer paste prepared in the above procedure so that thickness of the green sheet was 1.0 to 1.5 μm after drying. Next, after an electrode layer was printed thereon with a predetermined pattern by using the internal electrode layer paste, a sheet was removed from the PET film, so that a green sheet having the electrode layer was made. Next, a plurality of green sheets having the electrode layer were stacked and adhered by pressure to form a green stacking body. The green stacking body was cut in a predetermined size to obtain a green chip.

Next, the obtained green chip was subject to binder removal treatment, firing and annealing under following conditions, so that a multilayer ceramic firing body was obtained.

The binder removal treatment was performed under a condition of a temperature rising rate: 25° C./hr, a holding temperature: 260° C., a holding time: 8 hrs and atmosphere: in the air.

The firing was performed under a condition of a temperature rising rate: 1000° C./hr, a holding temperature: 1170° C., a holding time: 1 hr and a temperature descending rate: 1000° C./hr. Note that an atmosphere gas was wet $N_2+H_2$ mixture gas so that an oxygen partial pressure was adjusted to $10^{-12}$ MPa.

The annealing was performed under a condition of a temperature rising rate: 200° C./hr, a holding temperature: 1000° C., a holding time: 2 hrs, a temperature descending rate: 200° C./tar and atmosphere gas: wet $N_2$ gas (oxygen partial pressure $10^{-7}$ MPa).

Note that, a wetter was used for wetting the atmosphere gas at the firing and annealing.

Next, after polishing an end face of the obtained multilayer ceramic firing body by sandblast, Cu was coated as an external electrode, so that a multilayer ceramic capacitor sample shown in FIG. 1 was obtained. A size of the obtained capacitor sample was 3.2 mm×1.6 mm×0.6 mm, a thickness of the dielectric layer was about 0.9 μm, a thickness of the internal electrode layer was about 0.7 μm, and a number of the dielectric layer sandwiched by the internal electrode layer was set to 100.

For the obtained each capacitor sample, a specific permittivity, a dielectric loss, a CR product, a capacitance temperature characteristic and a high temperature accelerated lifetime (HALT) were measured by the methods shown below.

(Specific Permittivity $\in$)

The specific permittivity $\in$ was calculated from a capacitance of the obtained capacitor sample measured at a reference temperature of 25° C. with a digital LCR meter (4274A made by YHP) under a condition of a frequency of 1 kHz and an input signal level (measurement voltage) of 0.5 Vrms. Higher specific permittivity is preferable, and in the present example, samples in which specific permittivity was 2500 or higher were determined as good. The results are shown in Table 1.

(Dielectric loss (tan δ))

The dielectric loss (tan δ) was measured from the obtained capacitor sample at a reference temperature of 25° C. with a digital LCR meter (4274A made by YHP) under a condition of a frequency of 1 kHz and an input signal level (measurement voltage) of 0.5 Vrms. Lower dielectric loss is preferable, and in the present example, samples in which dielectric loss was 5.0% or less were determined as good. The results are shown in Table 1.

(CR Product)

On each capacitor sample, insulation resistance IR was measured after applying a direct-current voltage of 6.3 V/μm at 20° C. for 1 minute by using an insulation resistance tester (R8340A made by Advantest Corporation). A CR product was measured by obtaining a product of capacitance C (unit: μF) measured as explained above and insulation resistance IA (unit: MΩ). In the present examples, the samples in which the CR product was 1000 or higher were determined as good. The results are shown in Table 1.

(Capacitance Temperature Characteristic)

To the capacitor samples, a capacitance from −55 to 85° C. was measured so as to calculate a change rate ΔC of the capacitance, and it was evaluated whether the change rate satisfied the X5R characteristic of EIA standard or B characteristic or not. Namely, it was evaluated whether the change rate ΔC at 85° C. was within ±15% or not. The results are shown in Table 1.

(High Temperature Accelerated Lifetime)

To the capacitor samples, the lifetime was measured while applying the direct voltage under the electric field of 9 V/μm at 160° C., and thereby the high temperature load lifetime was evaluated. In the present example, the lifetime was defined as the time from the beginning of the voltage application until the insulation resistance dropped by one digit. Also, this high temperature accelerated lifetime evaluation was performed to 20 capacitor samples so that an average value was defined as the high temperature accelerated lifetime. As an evaluation criterion, 20 hrs or more was determined as good. The results are shown in Table 1.

From the table 1, when the contents of the oxide of Mg were out of the range of the present invention (samples 1 and 5), it was confirmed that the specific permittivity, capacitance temperature characteristic and high temperature accelerated lifetime tend to be deteriorated. Also, when the contents of the oxides of Mn and Cr were out of the range of the present invention (samples 6 and 11), it was confirmed that the capacitance temperature characteristic, high temperature accelerated lifetime and the like tend to be deteriorated. Further, when the contents of the oxides of V, No and W were out of the range of the present invention (samples 12 and 18), it was confirmed that CR product and high temperature accelerated lifetime tend to be deteriorated.

On the other hand, when the contents of the respective oxides were within a range of the present invention (samples 2 to 4, 7 to 10, 13 to 17), it was confirmed that excellent characteristics can be obtained.

TABLE 1

| Sample No. | $BaTiO_3$ (mol) | MgO in terms of Mg (mol) | MnO in terms of Mn (mol) | $V_2O_5$ in terms of V (mol) | R1 α (mol) | R2 β (mol) | $aBaO + bCaO + cSiO_2$ m (mol) | $β/(α + β)$ | $α + β$ |
|---|---|---|---|---|---|---|---|---|---|
| 1 | 100 | 0.30 | 0.16 | 0.03 | 0.20 | 0.40 | 1.30 | 0.67 | 0.60 |
| 2 | 100 | 0.60 | 0.16 | 0.03 | 0.20 | 0.40 | 1.30 | 0.67 | 0.60 |
| 3 | 100 | 1.50 | 0.16 | 0.03 | 0.20 | 0.40 | 1.30 | 0.67 | 0.60 |
| 4 | 100 | 2.00 | 0.16 | 0.03 | 0.20 | 0.40 | 1.30 | 0.67 | 0.60 |
| 5 | 100 | 2.20 | 0.16 | 0.03 | 0.20 | 0.40 | 1.30 | 0.67 | 0.60 |
| 6 | 100 | 0.70 | 0.005 | 0.07 | 0.30 | 0.60 | 0.80 | 0.67 | 0.90 |
| 7 | 100 | 0.70 | 0.010 | 0.07 | 0.30 | 0.60 | 0.80 | 0.67 | 0.90 |
| 8 | 100 | 0.70 | 0.30 | 0.07 | 0.30 | 0.60 | 0.80 | 0.67 | 0.90 |
| 9 | 100 | 0.70 | 0.30 (Cr) | 0.07 | 0.30 | 0.60 | 0.80 | 0.67 | 0.90 |
| 10 | 100 | 0.70 | 0.60 | 0.07 | 0.30 | 0.60 | 0.80 | 0.67 | 0.90 |
| 11 | 100 | 0.70 | 0.80 | 0.07 | 0.30 | 0.60 | 0.80 | 0.67 | 0.90 |
| 12 | 100 | 1.75 | 0.20 | 0.005 | 0.25 | 0.50 | 1.40 | 0.67 | 0.75 |
| 13 | 100 | 1.75 | 0.20 | 0.010 | 0.25 | 0.50 | 1.40 | 0.67 | 0.75 |
| 14 | 100 | 1.75 | 0.20 | 0.015 | 0.25 | 0.50 | 1.40 | 0.67 | 0.75 |
| 15 | 100 | 1.75 | 0.20 | 0.015 (Mo) | 0.25 | 0.50 | 1.40 | 0.67 | 0.75 |
| 16 | 100 | 1.75 | 0.20 | 0.015 (W) | 0.25 | 0.50 | 1.40 | 0.67 | 0.75 |
| 17 | 100 | 1.75 | 0.20 | 0.20 | 0.25 | 0.50 | 1.40 | 0.67 | 0.75 |
| 18 | 100 | 1.75 | 0.20 | 0.30 | 0.25 | 0.50 | 1.40 | 0.67 | 0.75 |

| Sample No. | $(α + β)/m$ | Firing temp. (° C.) | Specific permittivity | tanδ (%) | CR product | TC (%) | HALT (h) |
|---|---|---|---|---|---|---|---|
| 1 | 0.46 | 1170 | 2400 | 12.0 | 580 | −17.0 | 8.3 |
| 2 | 0.46 | 1180 | 4000 | 4.2 | 2100 | −8.0 | 22.0 |
| 3 | 0.46 | 1190 | 3650 | 3.8 | 2000 | −12.0 | 27.0 |
| 4 | 0.46 | 1200 | 3250 | 3.6 | 2000 | −13.5 | 32.0 |
| 5 | 0.46 | 1200 | 2300 | 2.8 | 2000 | −15.7 | 25.0 |
| 6 | 1.13 | 1260 | 3300 | 6.7 | 900 | −8.2 | 8.7 |
| 7 | 1.13 | 1220 | 3200 | 3.5 | 2000 | −9.2 | 23.0 |
| 8 | 1.13 | 1210 | 3100 | 3.3 | 2000 | −9.4 | 25.0 |
| 9 | 1.13 | 1220 | 3150 | 3.7 | 2000 | −9.1 | 20.0 |
| 10 | 1.13 | 1210 | 3000 | 3.0 | 1900 | −13.5 | 26.0 |
| 11 | 1.13 | 1200 | 2700 | 2.8 | 1000 | −17.0 | 25.0 |
| 12 | 0.54 | 1220 | 3600 | 3.8 | 2100 | −11.6 | 14.0 |
| 13 | 0.54 | 1200 | 3540 | 3.5 | 2000 | −10.9 | 23.0 |
| 14 | 0.54 | 1190 | 3470 | 3.4 | 1950 | −10.5 | 25.0 |
| 15 | 0.54 | 1180 | 3300 | 3.0 | 2000 | −11.5 | 21.0 |
| 16 | 0.54 | 1150 | 3100 | 2.9 | 2010 | −12.5 | 20.0 |
| 17 | 0.54 | 1190 | 3450 | 4.2 | 1930 | −9.3 | 31.0 |
| 18 | 0.54 | 1180 | 2890 | 4.9 | 900 | −7.3 | 12.0 |

Example 2

Except that the contents of the main component and the subcomponents were set as the amounts shown in Table 2, multilayer ceramic capacitor samples were produced as similar with the example 1 and characteristic evaluations as similar with the example 1 were performed. The results are shown in Table 2. Note that, for sample 41, a sample was produced by using a glass powder composed of BaO, CaO and $SiO_2$. $BaCO_3$, $CaCO_3$ and $SiO_2$ were wet mixed during 16 hrs by a ball mill, fired at 1150° C. in the air, and further wet-pulverized during 100 hrs by the ball mill so that the glass powder was produced. A particle size of the glass powder was 0.1 μm.

From the table 2, when the contents of the R1 were out of the range of the present invention (samples 21 and 30), it was confirmed that the specific permittivity, capacitance temperature characteristic, high temperature accelerated lifetime and the like were tend to be deteriorated. Also, when the contents of the R2 were out of the range of the present invention (samples 31 and 35), it was confirmed that the dielectric loss, high temperature accelerated lifetime and the like tend to be deteriorated.

On the other hand, when the contents of the R1 and R2 were within the range of the present invention (samples 22 to 29, 32 to 34), it was confirmed that good characteristics can be obtained. Note that, when elements other than Y as the R1 and

TABLE 2

| Sample No. | $BaTiO_3$ (mol) | MgO in terms of Mg (mol) | MnO in terms of Mn (mol) | $V_2O_5$ in terms of V (mol) | R1 α (mol) | R2 β (mol) | $aBaO + bCaO + cSiO_2$ m (mol) | $β/(α + β)$ | $α + β$ |
|---|---|---|---|---|---|---|---|---|---|
| 21 | 100 | 1.00 | 0.12 | 0.09 | 0.05 | 0.50 | 0.40 | 0.91 | 0.55 |
| 22 | 100 | 1.00 | 0.30 | 0.09 | 0.10 | 0.50 | 0.40 | 0.83 | 0.60 |
| 23 | 100 | 1.00 | 0.30 | 0.09 | 0.50 | 0.50 | 0.40 | 0.50 | 1.00 |
| 24 | 100 | 1.00 | 0.30 | 0.09 | 0.50 (Ho) | 0.50 | 0.40 | 0.50 | 1.00 |
| 25 | 100 | 1.00 | 0.30 | 0.09 | 0.50 (Yb) | 0.50 | 0.40 | 0.50 | 1.00 |
| 26 | 100 | 1.00 | 0.30 | 0.09 | 0.50 (Er) | 0.50 | 0.40 | 0.50 | 1.00 |
| 27 | 100 | 1.00 | 0.30 | 0.09 | 0.50 | 0.50 (Gd) | 0.40 | 0.50 | 1.00 |
| 28 | 100 | 1.00 | 0.30 | 0.09 | 0.50 | 0.50 (Tb) | 0.40 | 0.50 | 1.00 |
| 29 | 100 | 1.00 | 0.30 | 0.09 | 0.65 | 0.65 | 0.40 | 0.50 | 1.30 |
| 30 | 100 | 1.00 | 0.12 | 0.09 | 1.50 | 0.50 | 0.40 | 0.25 | 2.00 |
| 31 | 100 | 1.50 | 0.13 | 0.06 | 0.10 | 0.05 | 0.70 | 0.33 | 0.15 |
| 32 | 100 | 1.50 | 0.60 | 0.06 | 0.10 | 0.11 | 0.70 | 0.52 | 0.21 |
| 33 | 100 | 1.50 | 0.60 | 0.06 | 0.10 | 0.50 | 0.70 | 0.83 | 0.60 |
| 34 | 100 | 1.50 | 0.60 | 0.06 | 0.10 | 0.90 | 0.70 | 0.90 | 1.00 |
| 35 | 100 | 1.50 | 0.13 | 0.06 | 0.10 | 1.50 | 0.70 | 0.94 | 1.60 |
| 36 | 100 | 1.70 | 0.18 | 0.10 | 0.30 | 0.90 | 0.10 | 0.75 | 1.20 |
| 37 | 100 | 1.70 | 0.18 | 0.10 | 0.30 | 0.90 | 0.20 | 0.75 | 1.20 |
| 38 | 100 | 1.70 | 0.18 | 0.10 | 0.30 | 0.90 | 0.75 | 0.75 | 1.20 |
| 39 | 100 | 1.70 | 0.18 | 0.10 | 0.30 | 0.90 | 1.50 | 0.75 | 1.20 |
| 40 | 100 | 1.70 | 0.18 | 0.10 | 0.30 | 0.90 | 2.00 | 0.75 | 1.20 |
| 41 | 100 | 1.70 | 0.18 | 0.10 | 0.30 | 0.90 | 0.75 (glass) | 0.75 | 1.20 |

| Sample No. | $(α + β)/m$ | Firing temp. (° C.) | Specific permittivity | tanδ (%) | CR product | TC (%) | HALT (h) |
|---|---|---|---|---|---|---|---|
| 21 | 1.38 | 1210 | 4750 | 5.8 | 850 | −16.2 | 11.0 |
| 22 | 1.50 | 1210 | 4350 | 4.6 | 1750 | −12.5 | 21.0 |
| 23 | 2.50 | 1200 | 3800 | 4.0 | 2000 | −11.2 | 32.0 |
| 24 | 2.50 | 1200 | 3750 | 4.0 | 2020 | −10.7 | 25.0 |
| 25 | 2.50 | 1210 | 3680 | 3.8 | 1980 | −10.2 | 22.0 |
| 26 | 2.50 | 1210 | 3700 | 3.9 | 2010 | −9.7 | 20.0 |
| 27 | 2.50 | 1180 | 3600 | 3.5 | 1890 | −12.6 | 20.0 |
| 28 | 2.50 | 1170 | 3520 | 3.4 | 1820 | −13.8 | 20.2 |
| 29 | 3.25 | 1210 | 3000 | 3.2 | 1950 | −8.2 | 20.1 |
| 30 | 5.00 | 1210 | 2300 | 2.3 | 2000 | −7.5 | 13.0 |
| 31 | 0.21 | 1200 | 4800 | 6.0 | 970 | −8.9 | 11.0 |
| 32 | 0.30 | 1160 | 4350 | 4.2 | 1800 | −9.2 | 20.0 |
| 33 | 0.86 | 1180 | 4200 | 3.8 | 1750 | −9.7 | 28.0 |
| 34 | 1.43 | 1200 | 3680 | 3.2 | 2100 | −8.7 | 32.0 |
| 35 | 2.29 | 1220 | 3250 | 7.1 | 1300 | −12.3 | 17.0 |
| 36 | 12.00 | 1320 | 3200 | 6.4 | 780 | −13.0 | 12.0 |
| 37 | 6.00 | 1250 | 2900 | 3.4 | 1750 | −11.2 | 34.0 |
| 38 | 1.60 | 1210 | 2700 | 3.2 | 1850 | −10.8 | 36.0 |
| 39 | 100 | 1170 | 2900 | 3.2 | 2000 | −10.2 | 43.0 |
| 40 | 100 | 1160 | 2200 | 6.2 | 900 | −13.9 | 7.6 |
| 41 | 100 | 1240 | 2900 | 3.5 | 1750 | −10.2 | 14.0 | elements other than Dy as the R2 were selected (samples 24 to 28), it was confirmed that similar results can be obtained.

When the contents of the component including Ba and the like is out of the range of the present invention (samples 36 and 40), it was confirmed that the specific permittivity and high temperature accelerated lifetime tend to be deteriorated.

On the other hand, when the contents of the component were within the range of the present invention (samples 37 to 39), it was confirmed that good characteristics can be obtained.

Note that, when the component was added as a form of glass powder (sample 41), it was confirmed that the high temperature accelerated lifetime tends to be deteriorated.

Also, when the component is added as a form of composite oxide, it is confirmed by the present inventors that the high temperature accelerated lifetime tends to be deteriorated, as similar with the sample 41.

Example 3

Except that the contents of the main component and the subcomponents were set as the amounts shown in Table 3 and except for changing the values of "$\beta/(\alpha+\beta)$" and "$(\alpha+\beta)$" by changing contents of the oxides of R1 and R2, multilayer ceramic capacitor samples were produced as similar with the example 1 and characteristic evaluations as similar with the example 1 were performed. The results are shown in Table 3.

TABLE 3

| Sample No. | BaTiO$_3$ (mol) | MgO in terms of Mg (mol) | MnO in terms of Mn (mol) | V$_2$O$_5$ in terms of V (mol) | R1 $\alpha$ (mol) | R2 $\beta$ (mol) | aBaO + bCaO + cSiO$_2$ m (mol) | $\beta/(\alpha+\beta)$ | $\alpha + \beta$ |
|---|---|---|---|---|---|---|---|---|---|
| 51 | 100 | 1.70 | 0.18 | 0.10 | 0.10 | 0.10 | 0.80 | 0.50 | 0.20 |
| 52 | 100 | 1.70 | 0.18 | 0.10 | 0.10 | 0.20 | 0.80 | 0.67 | 0.30 |
| 53 | 100 | 1.70 | 0.18 | 0.10 | 0.20 | 0.30 | 0.80 | 0.60 | 0.50 |
| 54 | 100 | 1.70 | 0.18 | 0.10 | 0.40 | 0.90 | 0.80 | 0.69 | 1.30 |
| 55 | 100 | 1.70 | 0.18 | 0.10 | 0.70 | 1.00 | 0.80 | 0.59 | 1.70 |
| 56 | 100 | 1.70 | 0.18 | 0.10 | 0.21 | 0.09 | 0.80 | 0.30 | 0.30 |
| 57 | 100 | 1.70 | 0.18 | 0.10 | 0.10 | 0.20 | 0.80 | 0.67 | 0.30 |
| 58 | 100 | 1.70 | 0.18 | 0.10 | 0.20 | 0.30 | 0.80 | 0.60 | 0.50 |
| 59 | 100 | 1.70 | 0.18 | 0.10 | 0.20 | 1.00 | 0.80 | 0.83 | 1.20 |
| 60 | 100 | 1.70 | 0.18 | 0.10 | 0.10 | 1.00 | 0.80 | 0.91 | 1.10 |

| Sample No. | Firing temp. (°C.) | Specific permittivity | tanδ (%) | CR product | TC (%) | HALT (h) |
|---|---|---|---|---|---|---|
| 51 | 1190 | 4250 | 7.5 | 1200 | −13.0 | 7.0 |
| 52 | 1200 | 4040 | 4.8 | 1850 | −11.0 | 20.0 |
| 53 | 1210 | 3850 | 4.2 | 2050 | −9.8 | 28.0 |
| 54 | 1220 | 2850 | 3.2 | 2100 | −9.1 | 40.0 |
| 55 | 1300 | 2000 | 2.1 | 1800 | −12.0 | 42.0 |
| 56 | 1230 | 3950 | 3.5 | 2050 | −9.8 | 8.2 |
| 57 | 1200 | 4040 | 4.8 | 1850 | −11.0 | 20.0 |
| 58 | 1210 | 3850 | 4.2 | 2050 | −9.8 | 28.0 |
| 59 | 1220 | 2850 | 3.2 | 2100 | −9.1 | 40.0 |
| 60 | 1170 | 2750 | 7.2 | 1100 | −8.2 | 9.0 |

From the Table 3, when the values of "$\beta/(\alpha+\beta)$" and "$(\alpha+\beta)$" were out of the preferable range of the present invention (samples 51, 55, 56 and 60), it was confirmed that the specific permittivity, high temperature accelerated lifetime and the like tend to be deteriorated.

Example 4

Except that molar ratios of Ba, Ca and Si in the component including Ba and the like were set as the values shown in Table 4, multilayer ceramic capacitor samples were produced as similar with the sample 17 of the example 1, and characteristic evaluations as similar with the example 1 were performed. The results are shown in Table 4.

TABLE 4

| Sample No. | aBaO + bCaO + cSiO$_2$ m = 1.40 mol | | | Firing temp. (°C.) | Specific permittivity | tanδ (%) | CR product | TC (%) | HALT (h) |
|---|---|---|---|---|---|---|---|---|---|
| | a | b | c | | | | | | |
| 71 | 0.00 | 0.30 | 0.70 | 1190 | 3500 | 3.8 | 2100 | −9.1 | 24 |
| 72 | 0.20 | 0.15 | 0.65 | 1200 | 3420 | 3.5 | 2050 | −9 | 28 |
| 73 | 0.30 | 0.20 | 0.50 | 1220 | 3210 | 2.9 | 2100 | −8.9 | 22 |
| 74 | 0.50 | 0.15 | 0.35 | 1315 | 2450 | 2.8 | 1300 | −8.9 | 17 |

TABLE 4-continued

| Sample No. | aBaO + bCaO + cSiO$_2$ m = 1.40 mol | | | Firing temp. (°C.) | Specific permittivity | tanδ (%) | CR product | TC (%) | HALT (h) |
|---|---|---|---|---|---|---|---|---|---|
| | a | b | c | | | | | | |
| 75 | 0.25 | 0.00 | 0.75 | 1190 | 3520 | 3.7 | 2030 | −9.3 | 32 |
| 76 | 0.25 | 0.20 | 0.55 | 1210 | 3250 | 3.2 | 2090 | −9 | 34 |
| 77 | 0.25 | 0.50 | 0.25 | 1335 | 2250 | 2.4 | 2080 | −9.1 | 12 |
| 78 | 0.35 | 0.25 | 0.40 | 1305 | 2850 | 2.9 | 1950 | −9.1 | 13 |
| 79 | 0.20 | 0.25 | 0.55 | 1210 | 3050 | 3.3 | 2100 | −9.4 | 35 |
| 80 | 0.10 | 0.10 | 0.80 | 1170 | 3650 | 4.2 | 2000 | −8.8 | 22 |
| 81 | 0.05 | 0.05 | 0.90 | 1150 | 2800 | 7.2 | 900 | −7.2 | 11 | with respect to 100 moles of BaTiO$_3$
Mg: 1.75 mol
Mn: 0.20 mol
V: 0.20 mol
Y: 0.25 mol
Dy: 0.50 mol From the table 4, when the values of "a", "b" and "c" were out of the preferable range of the present invention (samples 74, 77, 78 and 81), it was confirmed that the specific permittivity, high temperature accelerated lifetime and the like tend to be deteriorated.

The invention claimed is:

1. A dielectric ceramic composition comprising:
a compound having perovskite type crystal structure shown by a general formula ABO$_3$, where A is at least one selected from the group consisting of Ba, Ca and Sr, and B is at least one selected from the group consisting of Ti, Zr and Hf, as a main component;
as subcomponents, in terms of respective element with respect to 100 moles of said compound,
0.6 to 2.0 moles of an oxide of Mg;
0.010 to 0.6 mole of an oxide of Mn and/or Cr;
0.010 to 0.2 mole of an oxide of at least one selected from the group consisting of V, Mo and W;
0.10 to 1.0 mole of an oxide of R1, where R1 is at least one selected from the group consisting of Y, Yb, Er and Ho;
0.10 to 1.0 mole of an oxide of R2, where R2 is at least one selected from the group consisting of Dy, Gd and Tb;
0.2 to 1.5 moles of a component consisting of an oxide of Ba and/or Ca and an oxide of Si.

2. The dielectric ceramic composition as set forth in claim 1, wherein
when a content of said oxide of R1 in terms of R1 is defined as "α" mole, and a content of said oxide of R2 in terms of R2 is defined as "β" mole, said "α" and "β" satisfy relations of $0.50 \leq \beta/(\alpha+\beta) \leq 0.90$ and $0.2 < (\alpha+\beta) < 1.5$.

3. The dielectric ceramic composition as set forth in claim 1, wherein
when a content molar ratio of said Ba is defined as "a", a content molar ratio of said Ca is defined as "b" and a content molar ratio of said Si is defined as "c" in said component, said "a", "b" and "c" satisfy relations of $a+b+c=1$, $a+b \leq c$, $0 \leq a \leq 0.5$, $0 \leq b \leq 0.5$ and $0.5 \leq c \leq 0.8$.

4. The dielectric ceramic composition as set forth in claim 1, wherein
when a content of said component in terms of the respective element is defined as "m" moles, said "α", "β" and "m" satisfy a relation of $(\alpha+\beta)/m \leq 10.5$.

5. The dielectric ceramic composition as set forth in claim 1, wherein
said R1 is Y and said R2 is Dy.

6. The dielectric ceramic composition as set forth in claim 1, wherein
said ABO$_3$ is BaTiO$_3$.

7. A ceramic electronic component comprising a dielectric layer composed of said dielectric ceramic composition as set forth in claim 1 and an electrode.

* * * * *